United States Patent [19]

Beuther et al.

[11] 3,997,431

[45] Dec. 14, 1976

[54] HYDRODESULFURIZATION PROCESS EMPLOYING A TITANIUM PROMOTED CATALYST

[75] Inventors: Harold Beuther, Gibsonia; Sun W. Chun, Murrysville; Angelo A. Montagna, Monroeville, all of Pa.

[73] Assignee: Gulf Research & Development Company, Pittsburgh, Pa.

[22] Filed: July 24, 1974

[21] Appl. No.: 491,233

Related U.S. Application Data

[63] Continuation-in-part of Ser. No. 278,959, Aug. 9, 1972, Pat. No. 3,840,433.

[52] U.S. Cl. ............................................. 208/216
[51] Int. Cl.$^2$ ....................................... C10G 23/02
[58] Field of Search ........................... 208/216, 217

[56] References Cited

UNITED STATES PATENTS

| | | | |
|---|---|---|---|
| 2,799,661 | 7/1957 | DeRosset | 208/216 |
| 2,866,751 | 12/1958 | Zimmerschied et al. | 208/217 |
| 3,016,346 | 1/1962 | O'Hara | 208/216 |
| 3,205,165 | 9/1965 | Hilfman | 208/216 |
| 3,836,452 | 9/1974 | Gleim | 208/216 |

Primary Examiner—George Crasanakis

[57] ABSTRACT

A process for the hydrodesulfurization of hydrocarbons employing a catalyst comprising Group VI and Group VIII metals supported on alumina and promoted with a minor amount of a Group IV-B metal. The process is particularly advantageous in the treatment of stocks containing substantial quantities of residual components, asphaltic materials and metalliferous contaminants, specifically stocks, such as, residual stocks.

19 Claims, No Drawings

HYDRODESULFURIZATION PROCESS EMPLOYING A TITANIUM PROMOTED CATALYST

CROSS REFERENCE TO RELATED APPLICATION

This application is a continuation-in-part of Application Ser. No. 278,959 filed Aug. 9, 1972 which is incorporated herein by reference thereto now U.S. Pat. No. 3,840,473.

BACKGROUND OF THE INVENTION

Our invention is directed to a process for the hydrodesulfurization of hydrocarbon stocks employing a catalyst comprised of Group VI and Group VIII hydrogenating components promoted with a minor amount of a Group IV-B metal. More particularly, our invention is advantageously employed for the hydrogen treatment of naphtha, distillate, lubricating oil and residual stocks in the presence of aforementioned catalyst.

It has previously been suggested in the art to effect sulfur removal from hydrocarbon stocks by subjecting them to treatment with hydrogen in the presence of elevated temperature and pressure while in contact with a catalyst containing hydrogenating components, either supported or unsupported. Typical of the catalysts suggested by the prior art are those containing Group VI and Group VIII metals, or their oxides and sulfides, as the hydrogenating components, supported on a variety of wellknown carriers, such as, for example, alumina, kieselguhr, zeolitic molecular sieves and other materials having high surface area. While these previously suggested techniques have generally been effective, to a greater or lesser extent, it is still desirable to obtain a hydrodesulfurization process wherein the overall operation is more effective or more advantageous from an economic viewpoint.

Our invention is directed to an improved process for the hydrodesulfurization of petroleum stocks such as naphtha and particularly those hydrocarbon stocks boiling generally above about 300° F. The process of our invention comprises contacting the hydrocarbon stock with hydrogen and a substantially phosphate-free catalyst comprising Group VI and Group VIII hydrogenating components present as the metals, their oxides or sulfides, supported on a non-zeolitic carrier, which catalyst is promoted with a minor amount of a Group IV-B metal.

The feed stocks suitable for employment in our process include all naphtha and heavier hydrocarbons. The feeds particularly suitable are those containing a substantial quantity of components, i.e., greater than 50% by volume, boiling above about 400° F. and preferably above about 500° F. Such materials can be synthetic crude oils such as those derived from shale oil, tar sands and coal or full petroleum crudes or any individual fraction thereof. Thus, for example, our feed stock can be an atmospheric topped crude or it can be a vacuum residual fraction boiling substantially above 950° F. Similarly, it can be a naphtha or any of the intermediate distillate fractions, such as, a furnace oil boiling from about 450° to about 650° F. or a gas oil boiling from about 650° to about 950° F. Preferably, however, we employ a feed stock which contains a substantial quantity of residual components, asphaltic contaminants and metalliferous components. Generally, we find that our process becomes more advantageous in the treatment of stocks wherein such components, contaminants and compounds comprise an increased proportion of the total charge stock. Accordingly, we find our process to be particularly advantageous in the treatment of residual fractions boiling substantially above 950° F.

In this connection, we intend the terms "residual", "residue" or "residual components," when used herein to describe the most difficulty vaporizable portion of the crude oil which normally cannot be distilled, in the absence of a vacuum, without effecting decomposition of the stock. Indicative of such residual component in a Conradson Carbon Number usually greater than about 1. Such a residual fraction can typically be obtained by vacuum distillation, i.e., a vacuum tower bottoms.

As mentioned above, the catalyst employed in our process must contain substantially no phosphates. While the presence of phosphates in the catalyst can be tolerated on the contaminant level, i.e., less than about 0.5% by weight and preferably less than about 0.1% by weight, it is desired that no phosphates be present at all. We find that phosphate levels even as low as about 1% by weight have an adverse affect upon the catalytic activity and a phosphate content approaching 2% by weight is completely unacceptable.

The carrier or support employed in the catalyst can be any non-zeolitic refractory oxide having a surface area in excess of 3 m²/g such as pure alumina, a so-called silica stabilized alumina containing up to about 5% by weight based upon the carrier of silica, silica gels, acid leached borosilicate glass and spinels, e.g. magnesium aluminate. Preferably, however, we employ an alumina carrier which is silica-free. Additionally, we prefer the carrier to be substantially free from the incorporation therein of refractory metal oxides, other than alumina, such as, thoria, boria, titania, magnesia, zirconia, etc., although the Group IV-B metals are to be added to the total catalyst. In any event, the preferred alumina employed in our process is not a zeolite but rather is of the more traditional type sometimes termed an amorphous alumina.

The hydrogenating component employed with our catalyst can be one of or a combination of the Group VI and Group VIII metals of their oxides or sulfides. We prefer to employ catalysts containing a combination of Group VI and Group VIII metalliferous components and particularly we prefer to employ such components in an atomic ratio of Group VIII metal to Group VI metal of at least 1:0.3, preferably at least about 1:0.5 and more preferably at least about 1:1.0. Generally, we do not employ such catalysts with a Group VIII to Group VI atomic ratio in excess of about 1:5, preferably an atomic ratio of less than about 1:3.5, and more preferably an atomic ratio of less than about 1:2.5. We find a particularly preferred catalyst contains the Group VIII and Group VI metals in an atomic ratio of less than about 1:1.75. Further, the catalysts of our invention have a total Group VI plus Group VIII metals content of at least about 5% by weight based upon the total catalyst and preferably at least about 8% by weight. As a general rule, we do not employ catalysts containing more than about 30% by weight metals and usually restrict total Group VI and Group VIII metal content to less than about 20% by weight. Preferred catalysts for use in our process can be comprised of combinations of the iron group metals and Group VI metals such as molybdenum and tungsten. Of the iron group metals we prefer to employ cobalt and nickel, with nickel being particularly preferred, and of the Group VI metals we prefer to employ molybdenum. Further, we prefer not to use chromium in the absence of other Group VI metals. Illustrative of particularly preferred catalysts for use in our invention are combinations of nickel-molybdenum and cobalt-molybdenum.

It is also a requirement of our invention that the catalyst employed be promoted with a Group IV-B metal, i.e. titanium, zirconium or hafnium. The Group IV-B component can be present in the catalyst composition as the metal, its oxide or its sulfide. Accordingly, we employ catalysts containing at least 1% by weight Group IV-B metal based upon the total catalyst and preferably containing at least about 2.5% by weight. While there does not appear to be any upper limit on the maximum amount of Group IV-B metal which can be employed, there does not appear to be any advantage to employing more than about 10% by weight based upon the total catalyst of such metal. Preferably, we employ catalysts containing less than about 8% by weight Group IV-B metal. Of the Group IV-B metals (titanium, zirconium and hafnium), we prefer to employ titanium and zirconium with titanium being particularly preferred.

The catalysts employed in our process can be produced by any of the techniques well known to the art so long as such techniques comply with the criteria set forth above. Thus, for example, a technique which would result in the incorporation of titanium into the body of the carrier, such as, for example, dispersion through our precipitation in the gel or sol pecursor would not be the most preferred technique. In fact, the Group IV metal required by our invention is preferably added to the catalyst after the alumina carrier has been calcined. In this connection, we prefer to add the Group IV-B metal by the technique of impregnating the calcined alumina with an aqueous solution of a salt of the Group IV-B metal such as titanium tetrachloride.

In the preparation of the catalyst composition, the Group VI metal can be deposited on the support from an aqueous solution of a salt such as ammonium molybdate, ammonium paramolybdate, molybdenum pentachloride or molybdenum oxalate. After filtering and drying the impregnated catalyst can then be calcined to convert the deposited molybdate salt to the oxide. The carrier can then be treated with an aqueous solution of the Group VIII metal salt, followed by calcining. If a second iron group metal is to be employed, the second iron group metal can be deposited in a like manner. Nitrates or acetates of the Group VIII metals are normally utilized although any water soluble salt which leaves no harmful residue can be employed.

If desired, the Group VIII metal and the Group VI metal can be deposited simultaneously, but are preferably deposited in sequence with intervening calcining. Simultaneous impregnation of the Group VIII metals has been found to be satisfactory. Following impregnation of the support with the Group VI and Group VIII metals, the Group IV-B metal can be deposited on the support from an aqueous solution of the salt of the Group IV-B metal in the manner previously described. The Group VIII and IV-B metals can also be deposited simultaneously.

The operating conditions employed in the process of our invention comprise a temperature in the range from about 500° to about 1000° F. (260° to 538° C.), preferably in the range from about 600° to about 800° F. (316° to 422° C.) and more preferably in the range from about 650° to about 800° F. (344° to 422° C.). The space velocity can be in the range from about 0.25 to about 10.0 volumes of charge stock per volume of catalyst per hour and preferably is in the range from about 0.5 to about 5.0. The hydrogen feed rate employed ranges from about 500 to about 10,000 standard cubic feed per barrel of feed stock (14,160 to 283,200 liters per 159 liters), preferably is in the range from about 1,000 to about 8,000 SCF/B (28,320 to 226,560 liters per 159 liters), and more preferably is in the range from about 2,000 to about 6,000 SCF/B (56,640 to 169,920 liters per 159 liters). The pressure employed in the process of our invention can be in the range from about 100 to about 5,000 PSIG (7.02 to 352 Kgs/cm$^2$). When treating a distillate charge stock, i.e., one containing substantially no residual components, the abovementioned broad range is satisfactory. Preferably, however, we employ pressures in the range from about 500 to about 3,000 PSIG (35.2 to 211 Kgs/cm$^2$). When treating a residual-containing stock, such as, for example, a reduced crude (atmospheric tower bottoms) or a residual stock boiling above about 950° F. or 509° C. (a vacuum tower bottoms), we prefer to employ pressures in the range from about 250 to about 2,500 PSIG (17.6 to 176 KGs/cm$^2$) and more preferably employ pressures less than about 2,000 PSIG (141 Kgs/cm$^2$). We have also found that pressures below about 1,000 PSIG (70.6 Kgs/cm$^2$) and even below about 800 PSIG (56.4 Kgs/cm$^2$) can be employed satisfactorily to treat residual containing stocks in accordance with our process. This ability to employ comparatively low pressures when treating residual-containing stocks in accordance with our invention, provides several advantages. As will readily be understood, the use of lower pressure permits the use of less expensive reaction vessels. Surprisingly, however, we have found that the catalysts employed in our process age extremely well in the low pressure treatment of residual containing stocks.

In order to illustrate our invention in greater detail, reference is made to the following examples.

EXAMPLE 1

A catalyst constituting the preferred catalyst of our invention was prepared by calcining in air 500 cc. of a commercially available alumina for 16 hours at 1,000° F. (538° C.). The weight of the calcined alumina was 309.5 grams. A first impregnation solution was prepared by dissolving 59.15 grams of ammonium paramolybdate and 26 cc. of ammonium hydroxide in 289.3 cc. of distilled water. This first impregnation solution was then employed to impregnate the calcined alumina by pouring the solution on the alumina with continuous mixing. After this first impregnation, the catalyst was oven dried for 16 hours at 250° F. (121° C.).

A second impregnation solution was prepared by dissolving 77.93 grams of Ni(NO$_3$)$_2$ · 6H$_2$O in 229.72 cc. of distilled water. This second impregnation solution was employed to impregnate the oven dried molybdenum containing material by pouring the second impregnation solution on the support with continuous mixing. After this second impregnation, the catalyst was oven dried at 250° F. (121° C.) for 16 hours and then calcined at 1,000° F. (538° C.) for 16 hours.

A third impregnation solution was prepared by dissolving 80.78 grams of titanium tetrachloride in 370 milliliters of n-heptane. This third impregnation solution was employed to impregnate the calcined molybdenum and nickel containing material under substantially anhydrous conditions. After the third impregnation, the catalyst was oven dried at 250° F. (121° C.) for 16 hours and calcined in air at 1,000° F. (538° C.) for 16 hours. The weight of the final catalyst was 399.0 grams and contained nominally 8% by weight molybdenum, 3% by weight nickel and 5% by weight titanium, all based on the total catalyst, to provide a Ni/Mo atomic ratio of about 1:1.6.

EXAMPLE 2

In this example, two comparative runs were conducted; one employing the catalyst of Example 1 and the other run employing a typical commercial catalyst employed for desulfurization and containing 0.5% by weight nickel, 1% by weight cobalt, and 8% by weight molybdenum, all based on the total catalyst. Both of these catalysts were supported on the same commercially available alumina. The feed stock employed in both of these runs was a 50% reduced Kuwait crude having a 5% point of about 760° F. (404° C.) and a 10% point of about 770° F. (410° C.) The average sulfur content of this charge stock was about 4% by weight.

The operating conditions initially employed in both of the runs of this example comprised a pressure of 500 PSIG (35.2 Kgs/cm$^2$), a hydrogen feed rate of 5,000 standard cubic feet per barrel (141,500 liters per 159 liters) and an LHSV of 0.5. In the run employing the catalyst of our invention, the initial operating temperature was 700° F. (371° C.), while the initial operating temperature in the run employing the commercial catalyst was 720° F. (382° C.). After about 45 hours, the operating temperature in the run embodying our invention was increased to 710° F. (377° C.) and at about 50 hours of operation the sulfur level of the treated stock was nominally 1% by weight (about 1.04% by weight). In the run employing the commercial catalyst, the catalyst appeared to be aging too rapidly and the sulfur content of the product had risen to a level of about 1.24% by weight sulfur at about 50 hours. The operating temperature was then increased from 720° F. to 730° F. (382° to 388° C.) in an effort to decrease both the sulfur content of the product and the aging rate of the catalyst. Such increase in temperature did not appear to affect the aging rate of the catalyst, which apparently remains somewhat consistent despite the more severe operating conditions.

At a period of 100 hours, the sulfur content of the product from the run employing the commercial catalyst had risen to a level of about 1.52% by weight. In contrast to this, the run embodying our invention produced a product containing about 1.0% by weight sulfur at a period of 93 hours.

From the above data, it will be seen that even at this early stage of operation, the process of our invention evidences a far greater decrease of catalyst stability over that obtained with a prior art catalyst.

Both runs were continued under the same conditions as described above, i.e., pressure at 500 PSIG (35.2 Kgs/cm$^2$), hydrogen feed rate of 5,000 standard cubic feet per barrel (141,500 liters per 159 liters) and an LHSV of 0.5 with a temperature of 730° F. (388° C.) being employed with the prior art catalyst and a temperature of only 710° F. (377° C.) being employed in the run embodying our invention. For all times subsequent to about 320 hours of operation the run employing the prior art catalyst produced a product containing more than 2.0% by weight sulfur and at a period of about 400 hours such catalyst produced a product containing about 2.15% by weight sulfur. In contrast to this, the run embodying our invention produced a product containing only about 1.75% by weight sulfur at about 432 hours while operating at a temperature 20° F. (11° C.) lower than that employed with the commercial catalyst. At this juncture, the run employing the prior art catalyst was discontinued since it was producing a product having an unacceptably high sulfur content. The run embodying our invention, however, was continued utilizing variations in operating conditions.

Accordingly, the operating temperature employed in the run embodying our invention was increased from 710° F. to 730° F. (377° to 388° C.) for a period of about 96 hours while maintaining the pressure, space velocity and hydrogen feed rate the same. This resulted in the production of a product having an average sulfur content of about 1.55% by weight. The operating pressure was then increased from 500 PSIG to 1,000 PGIG (35.2 to 70.4 Kgs/cm$^2$) while maintaining a temperature of 730° F. (388° C.), an LHSV of 0.5 and a hydrogen feed rate of 5,000 standard cubic feet per barrel (141,500 liters per 159 liters). This operation was continued for a period of about 160 hours during which time the sulfur content of the product remained consistently below 1.0% by weight.

Thereafter, the space velocity was increased from 0.5 to 1.0 LHSV while maintaining a temperature of 730° F. (388° C.), a pressure of 1,000 PSIG (70.4 Kgs/cm$^2$) and a hydrogen feed rate of 5,000 standard cubic feet per barrel (141,500 liters per 159 liters). These conditions were maintained for a period of about 96 hours during which time the sulfur content of the product remained consistently below about 1.45% by weight.

At this point, the operating conditions employed in the run embodying our invention were again altered so as to return to those conditions employed at the end of the first 432 hours of operation, i.e., a pressure of 500 PSIG (35.2 Kgs/cm$^2$), a temperature of 710° F. (377° C.), an LHSV of 0.5 and a hydrogen feed rate of 5,000 standard cubic feet per barrel (141,500 liters per 159 liters). These conditions were maintained for a period of 112 hours. At the end of this period, equal to a total of about 896 hours on stream, the sulfur content of the product was less than about 1.95% by weight sulfur.

EXAMPLE 3

In this example, five comparative runs were conducted employing as the feed stock a 50% reduced Kuwait crude containing about 4% by weight sulfur, i.e., the same feed stock as employed in Example 2. The operating conditions employed in all runs comprised a pressure of 1,000 PSIG (70.4 Kgs/cm$^2$), a temperature of 700° F. (371° C.), an LHSV of 1 and a hydrogen feed rate of 5,000 standard cubic feet per barrel of charge stock (141,500 liters per 159 liters).

In one run the same typical commercial desulfurization catalyst employed in Example 2 and containing 0.5% by weight nickel, 1% by weight cobalt and 8% by weight molybdenum supported on alumina was employed. In the other 4 runs of this example, catalysts in accordance with our invention and containing nickel, molybdenum and titanium with the same alumina carrier as employed in the commercial catalyst were utilized. The proportions of the molybdenum, nickel and titanium differed in each of these 4 catalysts. The particular nickel, molybdenum and titanium contents, expressed as weight % of the total catalyst, the atomic ratio of Group VIII to Group VI metals and the sulfur content of the product of 100 hours of operation are all shown in Table I below. Also shown in Table I is the composition of the commercial catalyst and the sulfur content in the product obtained with such catalyst at the end of 40 hours.

Table I

| Mo | Ni | Ti | Co | GpVIII/GpVI | S |
|----|-----|----|----|-------------|------|
| 8 | 0.5 | — | 1 | 1:9.81 | 1.63* |
| 8 | 8 | 3 | — | 1:0.61 | 1.60 |
| 8 | 6 | 5 | — | 1:0.82 | 1.53 |
| 8 | 6 | 3 | — | 1:0.82 | 1.46 |
| 8 | 3 | 5 | — | 1:1.63 | 1.32 |

*run terminated at 40 hrs.

From the above data, it will be noted that the typical commercial desulfurization catalyst produced a product containing about 1.63% by weight sulfur at the end of only 40 hours of operation. The sulfur content in the products obtained in the 4 runs in accordance with our invention are the results obtained after an operating period of 2-½ times that shown for the commercial catalyst. Thus, it will be noted that the catalyst containing 8% molybdenum, 8% nickel and 3% titanium wherein the atomic ratio of Group VIII to Group VI metal was 1:0.61 provided a product having a somewhat lower sulfur content at 100 hours than did the commercial catalyst at only 40 hours. Similarly, further improvement in the desulfurization obtained in accordance with our invention is illustrated by the catalyst wherein the atomic ratio of Grooup VIII to Group VI metals is at a level of 1:0.82. Finally, it will be seen that the catalyst containing 8% by weight molybdenum, 3% by weight nickel and 5% by weight titanium, having a Group VIII to Group IV atomic ratio of 1:1.63, provided a product having a sulfur content of only 1.32% by weight at 100 hours of operation.

EXAMPLE 4

Three comparative runs were made utilizing nickel and molybdenum-containing catalysts supported on a commercially available alumina and employing a 50% reduced Kuwait crude having about 4% sulfur as the feed stock. Of the three catalysts, only two contained titanium and the nickel content of the catalyst was varied both within and without the more preferred range of our invention. These three catalysts were employed separately in three different runs employing operating conditions comprising a temperature of 700° F. (371° C.), a pressure of 1,000 PSIG (70.4 Kgs/cm²), an LHSV of 1 and a hydrogen feed rate of 5,000 standard cubic feet per barrel (141,500 liters per 159 liters). The particular composition of each of the three catalysts together with the average sulfur content of the product obtained during the period from 8 to 40 hours of each run is shown in Table II below.

Table II

| Mo | Ni | Ti | Wt. % GpVIII/GpVI | Avg. S, wt.% |
|----|-----|----|-------------------|--------------|
| 8 | 1.5 | — | 1:3.27 | 1.46 |
| 8 | 1.5 | 5 | 1:3.27 | 1.40 |
| 8 | 3.0 | 5 | 1:1.63 | 1.15 |

From the above data, it will be seen that a catalyst containing nickel and molybdenum but containing no titanium was effective to produce a product having an average sulfur content of 1.46% by wt. It will also be seen that the addition of 5% titanium to such catalyst was effective to reduce the average sulfur content of the product to 1.40% by weight. The third catalyst, however, wherein nickel and molybdenum were present in the ratio preferred in accordance with our invention and which also contained titanium was effective to produce a product having a sulfur content of only 1.15% by wt. From this, it will be seen that the presence of titanium together with the presence of Group VI and Group VIII metals in the preferred ratio produces particularly advantageous results.

EXAMPLE 5

This example presents comparative data regarding the employment of catalysts employing each of the iron group metals in the process of our invention. All three catalysts herein contain 8% by weight molybdenum, 5% by weight titanium and 3% by weight of one of the iron group metals and the catalysts employ the same alumina carrier. The feed stock employed was a 50% reduced Kuwait crude and the operating conditions include a temperature of 700° F. (371° C.), a pressure of 1,000 pounds PSIG (70.4 Kgs/cm²), an LHSV of 1 and a hydrogen feed rate of 5,000 standard cubic feet per barrel (141,500 liters per 159 liters). The following Table III shows the sulfur, nickel and vanadium content of the feed stock as well as corresponding data obtained from the products during the period from 40 to 48 hours of each run. Additionally, Table III shows the per cent change in total metals content ($\Delta M$), per cent change in sulfur content ($\Delta S$) and the ratio of per cent change in metals content to per cent change in sulfur content ($\Delta M/\Delta S$).

Table III

|  | Feedstock | 3% Ni, 8% Mo, 5% Ti | 3% Co, 8% Mo, 5% Ti | 3% Fe, 8% Mo, 5% Ti |
|---|-----------|---------------------|---------------------|---------------------|
| S, wt. % | 4.13 | 1.21 | 1.37 | 2.33 |
| Ni, ppm by wt. | 19 | 11 | 8.1 | 7 |
| V, ppm by wt. | 58 | 14 | 13 | 14 |
| M, wt.% | — | 67.5 | 72.6 | 72.7 |
| S, wt.% | — | 70.7 | 66.9 | 43.6 |
| M/ S | — | 0.96 | 1.09 | 1.67 |
| GpVIII/GpVI | — | 1:1.63 | 1:1.64 | 1:1.55 |

The data in the above table show that all three iron group metals when employed in the catalyst of our invention are effective to reduce the sulfur content of the treated material. It will be noted, however, that the results obtained from the cobalt containing catalyst are more similar to those obtained when using the nickel containing catalyst as compared to the iron containing catalyst. Thus, while the nickel and cobalt containing catalysts are quite efficient in sulfur removal, these catalysts still permit a significant quantity of metals to pass through into the product for the amount of sulfur removed. This is to say, the ratio of $\Delta M/\Delta S$ is comparatively low for these catalysts while the ratio of $\Delta M/\Delta S$ for the iron containing catalyst is comparatively high. This is indicative of significant metals removal for the amount of sulfur removed. Accordingly, the iron containing catalyst is effective to produce a product of reduced metal content which product can advantageously be processed in operations sensitive to metals content.

EXAMPLE 6

In this example, comparative data is presented illustrating the efficacy of our invention for the production of an extremely low sulfur content product. A 50% reduced Kuwait crude containing nominally about 4% by weight sulfur was first subjected to hydrodesulfurization employing a pressure of 2,000 PSIG and a catalyst containing 0.5% by weight nickel, 1% by weight cobalt and 8% by weight molybdenum supported on an alumina carrier in order to produce a product containing nominally 1% by weight sulfur. The 700° F. + (371° C.+) fraction of this product, containing 1.09% by weight sulfur, was employed as the charge stock to two separate runs. In both runs, the temperature employed was 680° F. (360° C.), the total pressure was 1980 PSIG (139.3 Kgs/cm$^2$), the concentration of the gas stream was 95% hydrogen and the hydrogen feed rate was 5,000 standard cubic feet of hydrogen per barrel of feed stock (141,500 liters per 159 liters).

In one run, the catalyst employed was the same 0.5% by weight nickel, 1% by weight cobalt and 8% by weight molybdenum mentioned immediately above and the space velocity was 0.5 volumes of feed stock per volume of catalyst per hour. In the other run embodying our invention, the catalyst employed was 3% by weight nickel, 5% by weight titanium and 8% by weight molybdenum supported on an alumina carrier and the liquid hourly space velocity was 0.88 volumes of feed stock per volume of catalyst per hour. The following Table IV shows the sulfur content in the products of the two runs recorded at various times during the course of the runs.

Table IV

| Time | Commercial Catalyst (% by wt. sulfur) | Present Invention (% by wt. sulfur) |
|---|---|---|
| 16 hours | 0.25 | .37 |
| 24 hours | .32 | .36 |
| 32 hours | .36 | .36 |
| 40 hours | .38 | .37 |
| 48 hours | .39 | .36 |

From the above data, it will be seen that when employing a typical commercial catalyst, there is a rather rapid and severe deactivation during the course of the run demonstrating an unsatisfactory aging rate. As distinguished from this, the process of our invention was capable of producing a product of comparatively low sulfur content with no apparent aging or deterioration of the catalyst. It is further pointed out that the process of our invention was capable of providing these results when employing a space valocity more then 75% greater than employed with the commercial catalyst. Extrapolation of these data indicates that the process of our invention is capable of producing a product containing less than about 0.3% by weight sulfur when operating at a liquid hourly space velocity of about 0.5.

EXAMPLE 7

Comparative runs were conducted employing a variety of catalysts of the type required in our process. In all runs of this example, the feed stock employed was an atmospheric tower bottoms having a 5% point of 761° F. (405° C.), a 50% point of 983° F. (529° C.) and a sulfur content of 4% by weight. Similarly, the same hydrodesulfurization conditions were employed in all runs and included a temperature of 700° F. (371° C.), a pressure of 1,000 PSIG (70.4 Kgs/cm$^2$), a liquid hourly space velocity of 1 and a hydrogen feed rate of 5,000 SCF/B (141,500 liters per 159 liters). The catalyst employed in all the runs of this example contained 3% by weight nickel, 5% by weight Group IVB metal and varying quantities of a Group VI metal, all supported on the same alumina carrier. The particular metalliferous components of the various catalysts and their atomic ratios of Group VIII to Group VI metals together with the sulfur content of the product obtained at various times during the onstream period are shown in Table V below.

Table V

| | 3% Ni 4.33% Cr 5% Ti | 3% Ni 15.3% W 5% Ti | 3% Ni 8% Mo 5% Ti | 3% Ni 8% Mo 5% Zr |
|---|---|---|---|---|
| GpVIII/GpVI | 1:1.63 | 1:1.62 | 1:1.63 | 1:1.63 |
| Time, Onstream (Hours) S, Wt.% | | | | |
| 12 | 3.44 | 1.27 | 1.10 | 1.48 |
| 20 | 3.44 | 1.32 | 1.16 | 1.47 |
| 28 | 3.38 | 1.32 | 1.12 | 1.48 |
| 36 | 3.36 | 1.34 | 1.18 | — |
| 44 | 3.48 | 1.44 | 1.17 | 1.52 |
| 52 | 3.43 | 1.52 | 1.14 | 1.62 |
| 60 | 3.42 | 1.50 | 1.22 | 1.65 |
| 68 | 3.64 | 1.53 | 1.30 | 1.67 (69 hrs) |
| 76 | 3.52 | 1.56 | 1.27 | 1.74 (79 hrs) |
| 84 | 3.57 | 1.63 | 1.27 | — |
| 92 | 3.63 (91 hrs) | 1.59 | 1.28 | 1.77 (89 hrs) |
| 102 | — | | 1.38 | 1.86 (99 hrs) |

From the above, table, it will be seen that the catalyst employed in all the runs has substantially the same atomic ratio of Group VIII to Group VI metals, i.e., nominally about 1:1.6. Further, it will be noted that the Group IV-B metal, zirconium, was effective to provide an enhanced aging rate in accordance with our invention, although the zirconium was not quite as effective as the titanium. Thus, the basis for our preference for titanium over zirconium.

Similarly, it will be noted that when tungsten is employed instead of molybdenum, but in the same atomic ratio to the nickel, the catalyst is but slightly less active than the preferred molybdenum containing catalyst. On the other hand, however, the employment of chromium as the sole Group VI metal provided a catalyst that was substantially less active than either the molybdenum or tungsten containing catalysts. Thus, our preference for molybdenum over tungsten as the Group VI metal and our preference for either molybdenum or tungsten over chromium. In fact, we find it desirable not to employ chromium alone as the sole source of Group VI metal.

It must be pointed out, however, that even when employing the distinctly less active chromium component, the utilization of titanium in accordance with our process was effective to provide a decreased aging rate.

EXAMPLE 8

The data of this example serve to demonstrate that catalysts employing a zeolitic carrier are not effectively promoted by a Group IVB metal for hydrodesulfurization. To illustrate this distinction, a catalyst of the prior art was duplicated. Specifically, the titanium-nickel-molybdenum on zeolite catalyst described in Example 1 of U.S. Pat. No. 3,592,760 was produced. In this preparation, a commercially available ammonium Y-zeolite containing 1.6% by weight $Na_2O$ was slurried in water and then treated in the manner described in Example 1 of the patent in order to incorporate the titanium, molybdenum and nickel. After pelleting, the catalyst was calcined at 1,000° F. (537° C.).

A second catalyst in accordance with our invention was prepared by impregnating a commercial alumina. Thereafter, the impregnated material was dried and calcined to provide a catalyst of the type required in our process. In the preparation of both catalysts, the quantity of titanium, nickel and molybdenum employed was the stoichiometric quantity required to produce 5.6% $TiO_2$, 8.9% $MoO_3$ and 5.5% NiO indicated for the catalyst of Example 1 in the patent. The following Table VI shows the metal and metal oxide contents as well as the Group VIII to Group VI atomic ratios of the two catalysts. The values for the zeolitic supported catalysts were obtained by x-ray fluorescence and are believed to be accurate to ± 20%. The metals content indicated for the alumina support carrier are nominal levels based upon the quantity of metals impregnated.

Table VI

|  | Y-Zeolite Support | $Al_2O_3$ Support |
|---|---|---|
| Ti, Wt. % | 3.51 | 3.36 |
| Ni | 5.26 | 4.32 |
| Mo | 7.05 | 5.94 |
| $TiO_2$ | 5.85 | — |
| NiO | 6.69 | — |
| $MoO_3$ | 10.58 | — |
| GpVIII/GpVI | 1:0.82 | 1:0.84 |

The catalysts shown in Table VI above were presulfided at 600° F. (315° C.) with a 10:90 $H_2S$-$H_2$ mixture and portions thereof were employed in a series of comparative runs charging different charge stocks and employing a variety of conditions. In the first series of runs, a furnace oil nominally boiling in the range from about 400° (204° C.) to about 650° F. (344° C.) was subjected to hydrodesulfurization employing operating conditions of a pressure of 500 PSIG (35.2 Kgs/cm²), a liquid hourly space velocity of 3 and a hydrogen feed rate of 2,000 SCF/B (56,640 liters per 159 liters). The operating temperatures and product inspections for periods of operation are shown in Table VII below.

Table VII

|  |  | Alumina Support | | Y-Zeolite Support | | |
|---|---|---|---|---|---|---|
| Temp. ° F |  | 600 | 600 | 600 | 650 | 700 |
| Onstream Time (Hours) | Feed-Stock | 4–28 | 77–100 | 4–28 | 32–56 | 76–100 |
| Inspections: |  |  |  |  |  |  |
| Gravity (° API) | 22.6 | 26 | 25.7 | 24.2 | 24.7 | 25.5 |
| Sulfur (Wt.%) | 0.87 | 0.16 | 0.17 | 0.45 | 0.34 | 0.23 |
| ΔS, % |  | 81.6 | 80.4 | 48.2 | 60.9 | 73.6 |
| Nitrogen (ppm) | 255 | 112 | 144 | 135 | 94.3 | 37 |
| Hydrocarbon Type (FIA) |  |  |  |  |  |  |
| Aromatics | 73.5 | 78 | 84 | 80.0 | 83 | 81 |
| Olefins | 2.5 | 1 | 1 | 1.0 | 0 | 1 |
| Saturates | 24.0 | 21 | 15 | 19.0 | 17 | 18 |
| Distillation, ASTM D-86, ° F. |  |  |  |  |  |  |
| IBP | 404 (206° C) | 378 (192° C) | 394 (201° C) | 384 (196° C) | 379 (193° C) | 386 (197° C) |
| EP | 648 (342° C) | 651 (344° C) | 651 (344° C) | 656 (347° C) | 658 (348° C) | 652 (345° C) |
| 10% | 470 (244° C) | 453 (234° C) | 453 (234° C) | 455 (236° C) | 454 (235° C) | 444 (299° C) |
| 50% | 532 (278° C) | 520 (271° C) | 520 (271° C) | 528 (275° C) | 525 (273° C) | 522 (272° C) |
| 90% | 607 (320° C) | 602 (317° C) | 599 (315° C) | 609 (321° C) | 609 (321° C) | 604 (318° C) |

From the above data, it will be noticed that during the period from 4 to 28 hours, the catalyst of our invention effected somewhat greater than about 80% desulfurization when treating the furnace oil at the above operating conditions and a temperature of 600° F. (310° C.). At a comparable period of time and under identical conditions, the titanium-containing zeolitic catalyst effected only about 48% desulfurization. Further, it will be noted that during the period from 77 to 100 hours of operation, when employing a temperature of 600° F. (310° C.), the non-zeolitic catalyst of our process was still capable of effecting about 80% desulfurization. As distinguished from this, the zeolitic catalyst during a comparable period of operation and employing a temperature 100° F. greater was still only capable of effecting about 73% desulfurization. Thus, it will be seen that the alumina supported catalyst required in our process, even though not the most preferred form of such catalyst, still demonstrates an extremely high degree of stability as indicated by its extremely small deactivation and that during the period from about 77 to about 100 hours onstream, the catalyst required in our process is greater than 100° F.

Table IX

|  | Feedstock | Alumina Support | Y-Zeolite Support | |
|---|---|---|---|---|
| Temperature |  | 700° F. (371° C) | 700° F. (371° C) | 800° F. (426° C) |
| Pressure |  | 1,000 PSIG (70.4 Kgs/cm²) | 1,000 PSIG (70.4 Kgs/cm²) | 1,400 PSIG (98.6 Kgs/cm²) |
| Space Velocity |  | 1 LHSV | 1 LHSV | 2 LHSV |
| Onstream Time (Hours) |  | 40–64 | 40–64 | 36–72 |
| Inspections: |  |  |  |  |
| Gravity (° API) | 15.0 | 19.7 | 16.3 | 15.5 |
| Sulfur (Wt.%) | 4.0 | 1.47 | 3.33 | 3.34 |
| ΔS, % |  | 63.25 | 16.75 | 16.5 |
| Nitrogen (Wt.%) | 0.23 | 0.23 | 0.23 | 0.25 |
| Hydrogen (Wt.%) | 10.82 | 11.88 | 11.36 | 11.18 |
| C₅ Insol. (Wt.%) | 6.67 | 2.13 | 5.40 | 6.69 |
| Nickel (ppm) | 16 | 12 | 15 | 14 |
| Vanadium (ppm) | 52 | 16 | 37 | 23 |

(55.6° C.) more active than its zeolitic based counterpart.

Next, portions of each of the zeolitic supported catalyst and the alumina supported catalyst of our process were employed in the hydrodesulfurization of a vacuum gas oil nominally boiling in the range from about 650° F. (344° C.) to 1,000° F. (538° C.) and having a 10% point of 648° F. (343° C.), a 50% point of 797° F. (425° C.) and an end point of 1,000° F. (538° C.). The operating conditions employed in both runs include a temperature of 675° F. (357° C.), a pressure of 1,000 PSIG (70.4 Kgs/cm²), a liquid hourly space velocity of 3 and a hydrogen feed rate of 2,500 SCF/B (70,750 liters per 159 liters). The following Table VIII shows the feed stock and product inspections for the indicated onstream period of operation.

Table VIII

|  | Feedstock | Alumina Support | Y-Zeolite Support |
|---|---|---|---|
| Onstream Time (Hours) |  | 40–64 | 36–68 |
| Inspections: |  |  |  |
| Gravity (° API) | 24.1 | 28.5 | 26.2 |
| Sulfur (Wt.%) | 2.74 | 0.63 | 1.76 |
| S, % |  | 77.0 | 35.7 |
| Nitrogen (Wt.%) | 0.069 | 0.056 | 0.069 |
| Hydrocarbon Type (FIA) |  |  |  |
| Aromatics (Vol.%) | 46.8 | 44.3 | 46.3 |
| Saturates (Vol.%) | 48.5 | 55.7 | 53.7 |

Once again, it will be seen that the alumina supported catalyst of our process was effective to provide a high degree of desulfurization while the zeolite supported catalyst failed to provide a satisfactory level of desulfurization. It will further be noted that the ability of the zeolitic based catalyst to effect desulfurization appears to decrease as the boiling range of the feed stock increases.

In another comparison, three separate runs were conducted. In one run, the catalyst employed was the alumina based carrier required in our process. In the other two runs, the catalyst employed was the zeolitic supported catalyst. In all three of these runs, the feed stock employed was an atmospheric tower bottoms having a 5% point of 761° F. (405° C.) and a 50% point of 983° F. (531° C.) and the hydrogen feed rate was 5,000 SCF/B (141,500 liters per 159 liters). The particular operating conditions of temperature, pressure and space velocity employed in each run are set forth in Table IX below along with feed stock and product inspections.

From a comparison of the results shown in Table IX above for the runs utilizing an operating temperature of 700° F., etc., it will be seen that the alumina supported catalyst of our process is effective to provide substantial desulfurization while under identical operating conditions, the zeolitic supported catalyst was capable of effecting almost an insignificant degree of desulfurization. The third run shown in Table IX above was conducted to determine the effect of employing operating conditions of temperature, pressure and space velocity corresponding to those shown in U.S. Pat. No. 3,592,760 in the event that the increasing disparity in desulfurization results might possibly be caused by the selection of operating conditions which we prefer. It will be noted, however, that the employment of the same temperature, pressure and space velocity employed by patentee in no way improved the results obtained with the zeolitic supported catalyst. If anything, it would appear that the employment of such operating conditions caused a slight deterioration in results.

Finally, two comparative hydrodesulfurization runs were conducted employing a vacuum tower bottoms generally boiling above 950° F. (510° C.) as the feed stock. In one run, the catalyst employed was the promoted alumina based catalyst required by our process while in the other run, the titanium-containing zeolitic based catalyst was employed. In both runs, the operating conditions were identical to those employed in U.S. Pat. No. 3,592,760 and included a temperature of 800° F. (246° C.), a pressure of 1,400 PSIG (98.6 Kgs/cm²), an LHSV of 2 and a hydrogen feed rate of 12,000 SCF/B (339,000 liters per 159 liters). The feed stock and product inspections have different operating periods and these two runs are shown in Table X below.

Table X

| Onstream Time | | Alumina Support | | Y-Zeolite Support | |
|---|---|---|---|---|---|
| (Hours) | Feedstock | 12–22 | 58–82 | 12–24 | 60–72 |
| Inspections | | | | | |
| Gravity (° API) | 6.5 | 17.0 | 15.1 | 9.9 | 9.1 |
| Sulfur (Wt.%) | 5.43 | 1.14 | 1.71 | 4.04 | 4.29 |
| ΔS, % | | 79 | 68.5 | 25.6 | 20.9 |
| Nitrogen (Wt.%) | 0.39 | 0.32 | 0.37 | 0.39 | 0.39 |
| Carbon (Wt.%) | | | | | |
| Hydrogen (Wt.%) | 10.33 | 11.46 | 11.01 | 10.41 | 10.56 |
| $C_5°$ Insol. (Wt.%) | 15.20 | 4.80 | 6.69 | 13.40 | 11.90 |
| Nickel (ppm) | 33 | 16 | 19 | 28 | 29 |
| Vanadium (ppm) | 99 | 10 | 20 | 54 | 59 |

Again, the data in Table X demonstrate that the catalyst required in our process is effective to provide a satisfactory degree of desulfurization while the titanium promoted zeolitic based catalyst yielded an unsatisfactory low level of desulfurization. Further, it will be noted from the data presented in Tables VII through X that the difference in the hydrodesulfurization activity of the two catalysts employed appears to increase when the feed stock contains an increase in quantity of higher boiling materials, particularly residual fractions.

EXAMPLE 9

The data of this example serve to demonstrate that phosphorous-containing catalysts are not suitable for employment in our hydrodesulfurization process. Although it has previously been suggested in the art, such as, for example, in U.S. Pat. Nos. 3,493,517, 3,544,452 and 3,620,968, to employ metal phosphates, such as, titanium phosphate, in hydrogen treating processes, we find the presence of phosphorous or phosphates to be undesirable. To illustrate this distinction, a prior art catalyst (U.S. Pat. No. 3,493,517) was duplicated. Specifically, the procedure described in Example 3 of such patent was followed so as to produce a sulfided nickel-tungsten on silica alumina catalyst containing titanium phosphate. After the final washing and drying of the preparation, the material was calcined in air at 950° F. (510° C.) for 4 hours so as to produce the oxide form of the catalyst.

Two other catalysts in accordance with our invention were prepared by impregnation of a commercially available alumina followed by drying and calcining.

The following Table XI shows the metal and metal oxide contents of the three catalysts. The metal and metal oxide contents of the phosphorous-containing catalyst of the prior art are obtained by X-ray fluorescence and are believed to be accurate to ± 20%. The metals contents indicated for the phosphorous-free catalysts of our process are nominal amounts based upon the quantity of metals impregnated.

Table XI

| | Phosphorous-Containing Catalyst | Phosphorous-Free Catalyst | |
|---|---|---|---|
| NiO, Wt.% | 9.00 | — | — |
| Ni | 7.07 | 3 | 3 |
| $WO_3$ | 22.80 | — | — |
| W | 18.08 | 15.3 | 8 |
| $SiO_2$ | 21.59 | none | none |
| $Al_2O_3$ | 29.99 | balance | balance |
| $TiO_3$ | 8.87 | — | — |
| Ti | 4.48 | 5 | 5 |
| $P_2O_5$ | 7.92 | none | none |
| Surface Area, M²/g (BET) | 273.3 | 153.5 | 151.2 |
| GpVIII/GpVI atomic ratio | 1:0.82 | 1:1.62 | 1:0.85 |

After calcination, the phosphate catalyst was reduced at 425° F. (219° C.) and 800 PSIG (56.3 Kgs/cm²) for 8 hours in flowing hydrogen. All three catalysts were sulfided at 600° F. (316° C.) and atmospheric pressure for 8 hours with a gaseous mixture of $H_2S$ and $H_2$ in a 1:9 volume ratio.

Each of these catalysts was then employed in separate runs for the hydrodesulfurization of an atmospheric tower bottoms having a 5% point of 761° F. (405° C.) and a 50% point of 983° F. (528° C.). The operating conditions employed comprised a temperature of 700° F. (371° C.), a pressure of 1,000 PSIG (70.4 Kgs/cm²), a liquid hourly space velocity of 1 and a hydrogen feed rate of 5,000 SCF/B (141,500 liters per 159 liters). Feed stock and product inspections obtained during different operating periods of these three runs are shown in Table XII below.

Table XII

| Onstream Time | | Phosphorous-Containing Catalyst | | Phosphorous-Free Catalysts | | | |
|---|---|---|---|---|---|---|---|
| | | | | 15.3% W | | 8% W | |
| (Hours) | Feedstock | 8–32 | 72–96 | 8–32 | 72–96 | 8–32 | 72–88 |
| Inspections: | | | | | | | |
| Gravity (° API) | 15.0 | 20.0 | 18.8 | 20.2 | 19.8 | 19.1 | 18.6 |
| Sulfur (Wt.%) | 4.0 | 1.32 | 1.87 | 1.30 | 1.59 | 1.74 | 2.05 |
| S, % | | 67 | 53.25 | 67.5 | 60.25 | 56.5 | 48.75 |
| Nitrogen (Wt.%) | 0.23 | 0.19 | 0.21 | 0.21 | 0.21 | 0.24 | 0.22 |
| Hydrogen (Wt.%) | 10.82 | 11.64 | 11.74 | 11.84 | 11.84 | 11.93 | 11.70 |
| $C_5°$ Insol (Wt.%) | 6.67 | 2.16 | 3.10 | 2.45 | 3.01 | 3.35 | 3.40 |
| Nickel (ppm) | 16 | 9.4 | 11.5 | 9.6 | 11 | 10.7 | 12.0 |
| Vanadium (ppm) | 52 | 13.7 | 21.0 | 14.7 | 18.33 | 18.7 | 23.0 |

From the above data, it will be seen that, as might be expected, the initial activity of both the phosphorous-containing and the 15% W, phosphorous-free catalysts were substantially the same. This is indicated by the sulfur contents and the amount of desulfurization effected during the onstream periods from 8 to 32 hours. It will be noted, however, that during the onstream periods from 72 to 96 hours, the amount of desulfurization effected with the phosphorous-containing catalyst decreased to about 53.5%, while the 15% phosphorous-free catalyst required in our process was far more active and still effective to provide about 60% desulfurization. This data illustrates that the presence of phosphorous in the catalyst has a deleterious effect upon aging rate.

Referring now to the data obtained with the 8% W, phosphorous-free catalyst, it will be seen that, although such catalyst does not have an atomic ratio of Ni/W within our preferred range, it is still an effective hydrodesulfurization catalyst. Further, it will be noted that the deactivation rates for the phosphorous-free catalysts, as indicated by the differences in product sulfur contents for the two operating periods, are substantially identical (0.29% versus 0.31%). As distinguished from this, the deactivation rate for the phosphorous-containing catalyst is 0.55%.

Extrapolation of the above data also indicate that, while the phosphorous-containing catalyst may be initially more active than the 8% W, phosphorous-free catalyst, the phosphorous-free catalyst will be more active than the phosphorous-containing catalyst for periods of operation in excess of about 110-120 hours onstream.

EXAMPLE 10

In this example, the effectiveness of the titanium promoted catalyst composition in the desulfurization of a gas oil is demonstrated. The catalyst employed in the desulfurization run was comprised of 3.0 weight percent nickel, 5.0 weight percent titanium, 8.0 weight percent molybdenum and alumina with the metals deposited on the support by a standard impregnation procedure. The gas oil feed in the desulfurization run was characterized as follows:

| | | |
|---|---|---|
| Gravity (° API) | 24.0 | |
| Sulfur (wt. %) | 2.66 | |
| Nitrogen (wt. %) | 0.069 | |
| Aniline Point (° F.) | 174.3 | (79° C.) |
| Distillation, Vacuum, ° F. | | |
| 5% condensed | 636 | (335° C.) |
| 10% | 681 | (360° C.) |
| 20 | 722 | (383° C.) |
| 30 | 751 | (399° C.) |
| 40 | 774 | (412° C.) |
| 50 | 809 | (431° C.) |
| 60 | 845 | (452° C.) |
| 70 | 887 | (475° C.) |
| 80 | 922 | (494° C.) |
| 90 | 960 | (515° C.) |
| 95 | 991 | (533° C.) |

The catalyst in the run was in the form of 1/32 inch extrudates. The total pressure in the hydrodesulfurization run was 500 PGIG (35.2 Kgs/cm$^2$), the liquid hourly space velocity was 1.0, and the hydrogen circulation rate was 2,000 standard cubic feet per barrel of feed (56,640 liters per 159 liters). The hydrogen had a purity of 80%.

The hydrosulfurization run was conducted for a period of 34 days to produce a product containing 0.16 weight percent sulfur. On the 7th day of operation, a hydrodesulfurization temperature of 723° F. (383° C.) was required. On the 34th day of operation a hydrodesulfurization temperature of 735° F. (390° C.) was required. Thus, the catalyst aging rate during the run was 0.46° F. (.26° C.) per day.

EXAMPLE 11

This example demonstrates the effectiveness of the titanium promoted catalyst in the desulfurization of a furnace oil. The catalyst composition of Example 10 was employed in the run of this example. 201.2 grams of the catalyst was placed in a vertical catalyst bed which measured 28-⅛ inches in height. The furnace oil feed in the desulfurization run was characterized as follows:

| | | |
|---|---|---|
| Gravity (° API) | 34.3 | |
| Sulfur (wt. %) | 1.05 | |
| Nitrogen (wt. %) | 0.011 | |
| Aniline Point (° F.) | 152.6 | (84.7° C.) |
| Distillation, Vacuum, ° F. | | |
| 5% condensed | 497 | (258° C.) |
| 10 | 516 | (269° C.) |
| 20 | 538 | (281° C.) |
| 30 | 549 | (287° C.) |
| 40 | 557 | (292° C.) |
| 50 | 566 | (297° C.) |
| 60 | 579 | (304° C.) |
| 70 | 592 | (311° C.) |
| 80 | 609 | (321° C.) |
| 90 | 632 | (333° C.) |
| 95 | 649 | (343° C.) |
| End Point | 676 | (358° C.) |

The catalyst of the run was in the form of 1/32 inch extrudates. The total pressure employed in the desulfurization run was 497 PSIG (35 Kgs/cm$^2$); the liquid hourly space velocity was 3.99; and the hydrogen circulation rate was 1,572 standard cubic feet per barrel of feed (44,500 liters per 159 liters). The hydrogen purity was 80.9% and the average temperature during the run was 700° F. (371° C.).

The hydrodesulfurization run was conducted for a period of 8 hours to produce a product containing 0.05 weight percent sulfur.

Although the invention has been described with reference to specific embodiments, references, and details, various modifications and changes will be apparent to one skilled in the art and are contemplated to be embraced in this invention.

We claim:
1. A process for the hydrodesulfurization of a sulfur-containing hydrocarbon stock selected from the group consisting of naphtha and heavier hydrocarbons which comprises contacting the hydrocarbon stock with hydrogen and a catalyst substantially free of phosphates and consisting essentially of a hydrogenating metal selected from Group VI and a hydrogenating metal selected from Group VIII, both hydrogenating metals being in the sulfided form, supported on a non-zeolitic refractory oxide carrier and promoted with from about 1 to about 10 weight per cent of a Group IV-B metal by the addition of the Group IV metal to said carrier after calcination of said carrier, the contacting being conducted at a temperature from about 500° F. to about 1,000° F., a pressure from about 100 to about 5,000 PSIG, a liquid hourly space velocity from about 0.25 to about 10.0 volumes of hydrocarbon stock per volume of catalysts per hour and a hydrogen feed rate from about 500 to about 10,000 standard cubic feet of hydrogen per barrel of hydrocarbon stock.

2. A process for the hydrodesulfurization of a sulfur-containing hydrocarbon stock containing greater than 50 per cent by volume of materials boiling above about 400° F. which comprises contacting the hydrocarbon stock with hydrogen and a catalyst substantially free of phosphates and consisting essentially of a hydrogenating metal selected from Group VI and a hydrogenating metal selected from Group VIII, both hydrogenating metals being in the sulfided form, supported on a non-zeolitic refractory oxide carrier and promoted with from about 1 to about 10 weight per cent of a Group IV-B metal by the addition of the Group IV-B metal to said carrier after calcination of said carrier, the contacting being conducted at a temperature from about 500° F. to about 1,000° F., a pressure from about 100 to about 5,000 PSIG, a liquid hourly space velocity from about 0.25 to about 10.0 volumes of hydrocarbon stock per volume of catalyst per hour and a hydrogen feed rate from about 500 to about 10,000 standard cubic feet of hydrogen per barrel of hydrocarbon stock.

3. The process of claim 2 wherein the hydrocarbon stock contains substantial quantities of residual components, asphaltic materials and metalliferous contaminants.

4. The process of claim 2 wherein the hydrocarbon stock boils up to about 950° F.

5. The process of claim 2 wherein the hydrocarbon stock boils above about 950° F.

6. The process of claim 1 in which the atomic ratio of Group VIII to Group VI metals is in the range from about 1:0.3 to about 1:5.

7. The process of claim 6 wherein the atomic ratio of Group VIII to Group VI metals is greater than about 1:0.5.

8. The process of claim 3 wherein the pressure is less than about 2,000 PSIG.

9. The process of claim 4 wherein the pressure is in the range from about 500 PSIG to about 3,000 PSIG and the temperature is less than about 800° F.

10. The process of claim 1 in which the Group VI metal comprises molybdenum, the Group VIII metal comprises nickel, and wherein the Group IV-B metal comprises titanium.

11. The process of claim 2 in which the Group VI metal comprises molybdenum, the Group VIII metal comprises nickel, and wherein the Group IV-B metal comprises titanium.

12. The process of claim 4 in which the Group VI metal comprises molybdenum, the Group VIII metal comprises nickel, and wherein the Group IV-B metal comprises titanium.

13. The process of claim 1 in which the refractory oxide carrier comprises alumina.

14. The process of claim 2 in which the refractory oxide carrier comprises alumina.

15. A process for the hydrodesufurization of a sulfur-containing hydrocarbon stock selected from the group consisting of naphtha and heavier hydrocarbons which comprises contacting the hydrocarbon stock with hydrogen and a catalyst substantially free of phosphates and consisting essentially of a hydrogenating metal selected from Group VI and a hydrogenating metal selected from Group VIII, both hydrogenating metals being in the sulfided form, supported on a non-zeolitic refractory oxide carrier and promoted with from about 1 to about 10 weight per cent of a Group IV-B metal by the addition of the Group IV metal to said carrier after said Group IV and Group VIII hydrogenating metals had been composited with said carrier, the contacting being conducted at a temperature from about 500° F. to about 1,000° F., a pressure from about 100 to about 5,000 PSIG, a liquid hourly space velocity from about 0.25 to about 10.0 volumes of hydrocarbon stock per volume of catalyst per hour and a hydrogen feed rate from about 500 to about 10,000 standard cubic feet of hydrogen per barrel of hydrocarbon stock.

16. A process for the hydrodesulfurization of a sulfur-containing hydrocarbon stock selected from the group consisting of naphtha and heavier hydrocarbons which comprises contacting the hydrocarbon stock with hydrogen and a catalyst substantially free of phosphates and consisting essentially of a hydrogenating metal selected from Group VI and a hydrogenating metal selected from Group VIII, both hydrogenating metals being in the sulfided form, supported on a non-zeolitic refractory oxide carrier and promoted with from about 1 to about 10 weight per cent of a Group IV-B metal by the addition of the Group IV metal after said Group VI hydrogenating metal had been composited with said carrier, the contacting being conducted at a temperature from about 500° F. to about 1,000° F., a pressure from about 100 to about 5,000 PSIG, a liquid hourly space velocity from about 0.25 to about 10.0 volumes of hydrocarbon stock per volume of catalyst per hour and a hydrogen feed rate from about 500 to about 10,000 standard cubic feet of hydrogen per barrel of hydrocarbon stock.

17. A process for the hydrodesulfurization of a sulfur-containing hydrocarbon stock selected from the group consisting of naphtha and heavier hydrocarbons which comprises contacting the hydrocarbon stock with hydrogen and a catalyst substantially free of phosphates and consisting essentially of a hydrogenating metal selected from Group VI and a hydrogenating metal selected from Group VIII, both hydrogenating metals being in the sulfided form, supported on a non-zeolitic refractory oxide carrier and promoted with from about 1 to about 10 weight per cent of a Group IV-B metal by the addition of the Group IV metal to said carrier simultaneously with compositing said Group VI and Group VIII hydrogenating metals with said carrier, the contacting being conducted at a temperature from about 500° F. to about 1,000° F., a pressure from about 100 to about 5,000 PSIG, a liquid hourly space velocity from about 0.25 to about 10.0 volumes of hydrocarbon stock per volume of catalyst per hour and a hydrogen feed rate from about 500 to about 10,000 standard cubic feet of hydrogen per barrel of hydrocarbon stock.

18. The process of claim 1 wherein said non-zeolitic refractory oxide carrier is selected from the group consisting of alumina and silica-stabilized alumina.

19. The process of claim 2 wherein said non-zeolitic refractory oxide carrier is selected from the group consisting of alumina and silica-stabilized alumina.

* * * * *

UNITED STATES PATENT AND TRADEMARK OFFICE
CERTIFICATE OF CORRECTION

PATENT NO. : 3,997,431
DATED : December 14, 1976
INVENTOR(S) : Harold Beuther, Sun W. Chun, & Angelo A. Montagna It is certified that error appears in the above-identified patent and that said Letters Patent are hereby corrected as shown below:

Column 3, line 32, "our" should read --- or ---.

Column 3, line 32, "pecursor" should read --- precursor ---.

Column 7, line 33, "Grooup" should read --- Group ---.

Column 12, Table VII, Last Column, "(299°C) should read --- (229°C) ---.

Column 17, line 2, "15%" should read --- 15% W, ---.

Column 20, Claim 15, Line 3, "Group IV" should read --- Group VI ---.

Signed and Sealed this

Eighth Day of March 1977

[SEAL]

*Attest:*

RUTH C. MASON
*Attesting Officer*

C. MARSHALL DANN
*Commissioner of Patents and Trademarks*